Oct. 31, 1950 R. F. WILD 2,527,665
MEASURING AND CONTROLLING APPARATUS, INCLUDING
DAMPING AND RECORDING ELEMENTS
Filed June 21, 1946 3 Sheets-Sheet 3

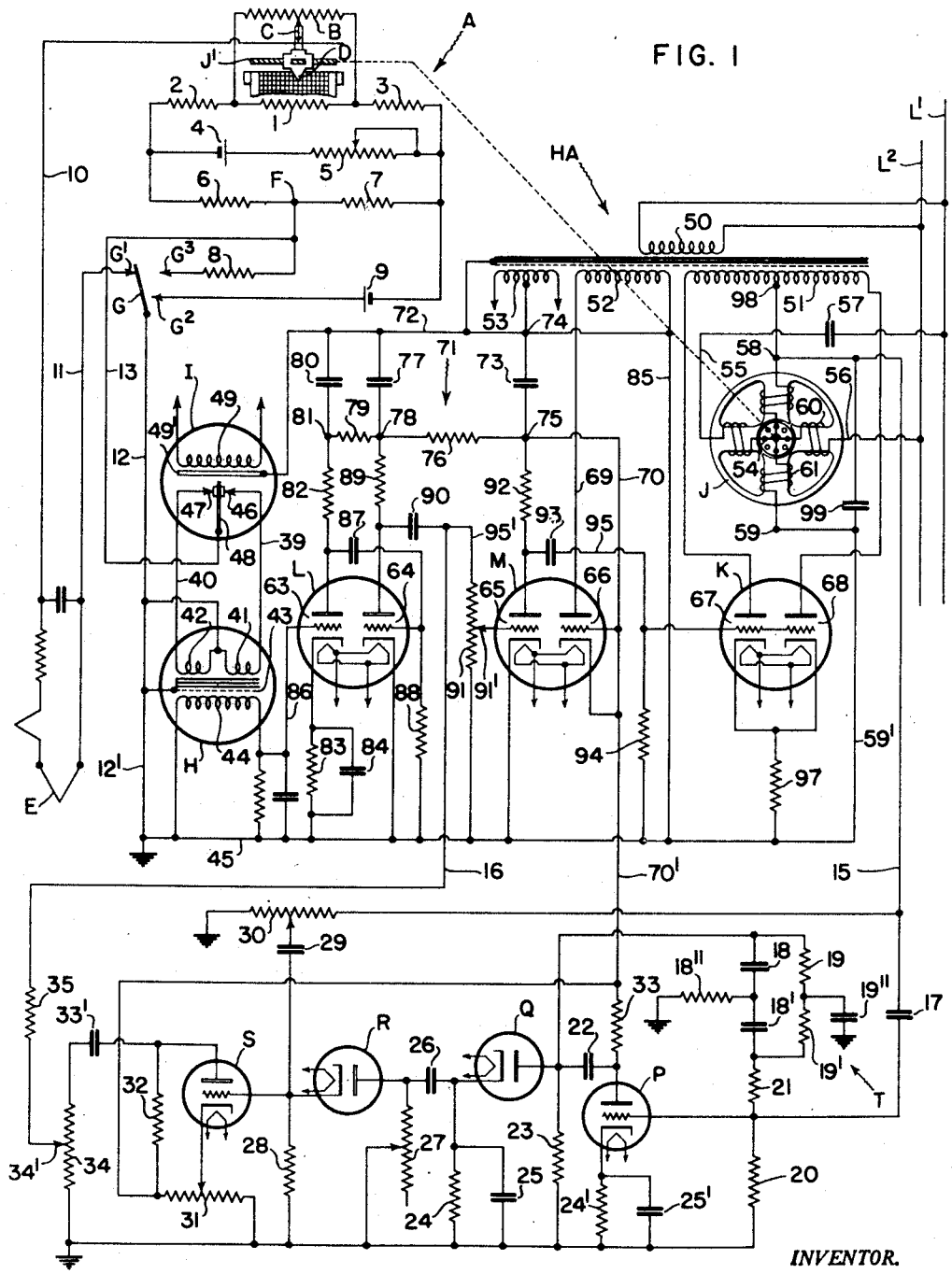

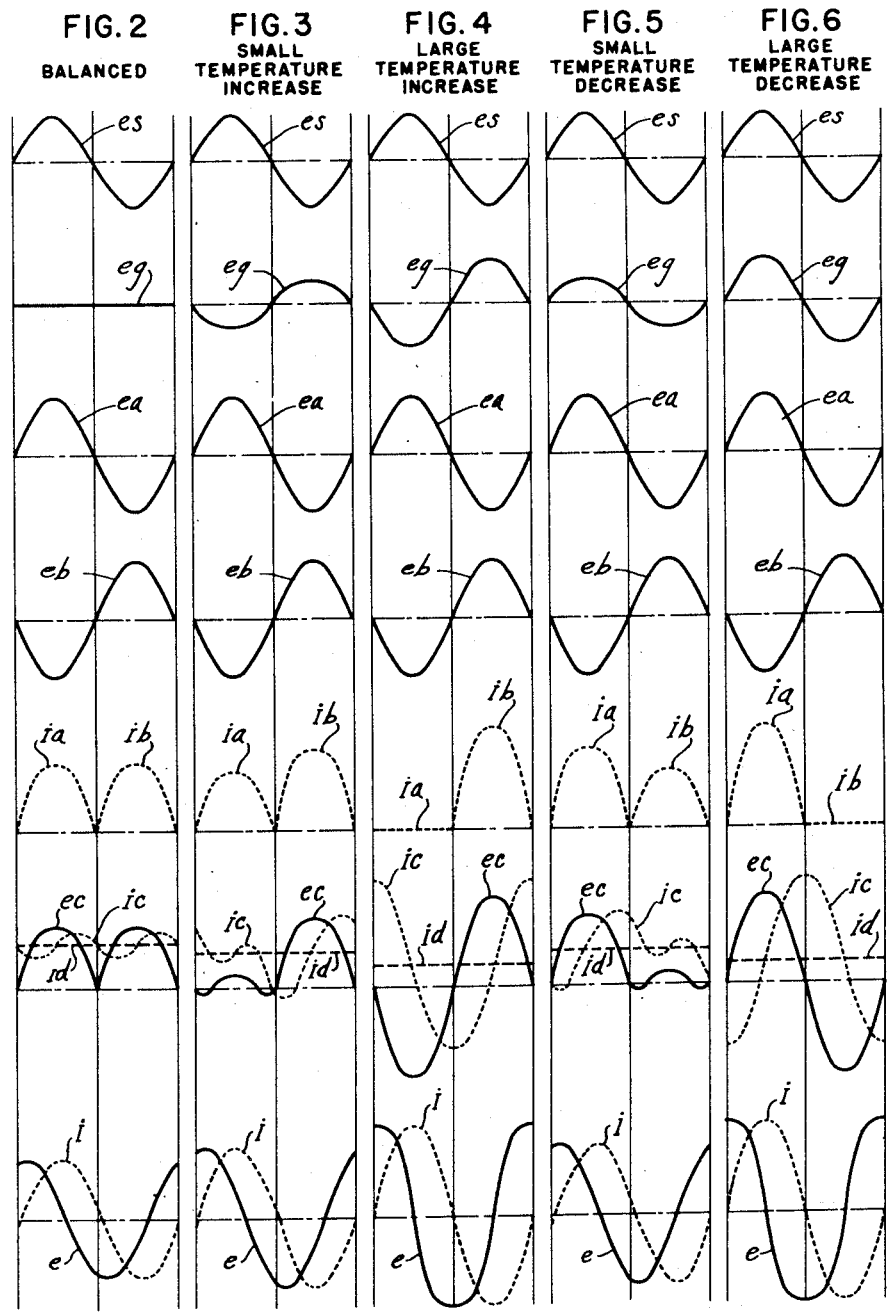

INVENTOR.
RUDOLF F. WILD
BY Arthur H. Swanson
ATTORNEY.

Patented Oct. 31, 1950

2,527,665

UNITED STATES PATENT OFFICE 2,527,665

MEASURING AND CONTROLLING APPARATUS, INCLUDING DAMPING AND RECORDING ELEMENTS

Rudolf F. Wild, Philadelphia, Pa., assignor, by mesne assignments, to Minneapolis-Honeywell Regulator Company, Minneapolis, Minn., a corporation of Delaware Application June 21, 1946, Serial No. 678,258

27 Claims. (Cl. 318—28)

1

The general object of the present invention is to improve self balancing measuring and control apparatus of known type comprising a normally balanced measuring or control circuit network which is unbalanced by changes in the quantity measured and which is rebalanced by a reversible electric motor, and which also comprises an electronic voltage and power amplifying system of known type through which said motor is operated by means responsive to unbalance of said network. Said electronic system operates to amplify a 60 cycle or other relatively low frequency alternating current signal received from said responsive means and of a magnitude in predetermined proportion to the extent of network unbalance and to deliver current of said relatively low frequency to a control winding of the rebalancing motor thereby to effect operation of the motor in selective accordance with the phase and amplitude of said signal.

An electronic system of the above mentioned type is employed to control the operation of the reversible rebalancing motor of a conversion type potentiometric measuring and control instrument now in extensive use in this country and manufactured and sold by The Brown Instrument Co. The essentials of that system and instrument are fully disclosed in the Walter P. Wills Patent 2,423,540, granted July 8, 1947, on an application, filed December 1, 1941. When the circuit network of that instrument is unbalanced, the electronic system supplies alternating current to the control winding of the rebalancing motor which leads or lags, by approximately 90°, the alternating current of the same frequency separately supplied to the power winding of the motor, accordingly as the measuring system is unbalanced in one direction or in the opposite direction. In practice, the electronic system and the power winding of the motor are energized by the same source of alternating current, the frequency of which ordinarily is, and is hereinafter assumed to be, 60 cycles. The motor rotation results from the rotating magnetic field created by the flow of phase-displaced currents of the same frequency in the two motor windings.

The above mentioned amplifying and motor drive system is characterized by the fact that when the measuring system is balanced, the current supplied to the control winding of the motor

2 includes a direct current component and an alternating current component with a frequency double that of the alternating current supply source. When the measuring system is but slightly unbalanced, the current supplied to the control winding of the motor includes a third component which is a 60 cycle alternating current. Substantially no 60 cycle component is included in the control winding current when the measuring system is fully balanced. Neither the direct current component, nor the double frequency alternating current component, of the motor control winding current coacts with the power winding current to provide a motor driving torque, but each of those components does subject the motor to a damping or braking action, which action is smaller than is needed in many applications.

A primary object of the present invention is to provide apparatus of the above mentioned type with means for detecting, amplifying, and utilizing the double frequency component of current supplied to the control winding of the motor for one or more operations of the apparatus made appropriate by the attainment of measuring circuit balance, or by a close approach thereto.

A more general object of the invention is to provide self balancing apparatus of the above mentioned type with a control mechanism for producing a control action as balance is attained or closely approached, including frequency discriminating means which is connected to the control winding of the rebalancing motor, and which is adapted to be responsive to the above mentioned double frequency current in some cases, and which, in other cases, is adapted to respond to different and much higher current frequencies.

Thus, in my concurrently filed copending application, Serial No. 678,256, which issued as Patent No. 2,506,006 on May 2, 1950, I disclose an embodiment of the invention generically claimed herein, in which the signal frequency detected by the frequency discriminator may be 15,000 cycles or so per second. In that embodiment of the present invention, I utilize the discovery, made by me, that it is practically feasible to couple together the input and output circuits of the electronic amplifying system of the above mentioned conversion type instrument, so as to produce oscillating currents of high frequency, and to superimpose such a high frequency oscillating current or signal on a low frequency motor drive signal in a conversion type electronic system so proportioned that the high frequency current will be cut off, or clipped as a result of tube saturation and cut-off, except when the motor drive signal becomes very small as it does when balance is being closely approached. In consequence, the appearance of the high frequency oscillating current in the control winding circuit of the rebalancing motor indicates the attainment of balance or a close approach thereto.

In said copending application, I disclose control apparatus analogous to the apparatus shown and hereinafter described for actuation to produce an appropriate control action upon the appearance in the control winding of the motor of a current of higher frequency than the motor drive current.

A specific object of the present invention is to provide simple and effective means for utilizing the higher frequency current in damping the rebalancing motor.

A suitable motor damping action during the final stage of each rebalancing operation contributes to efficient operation. When the damping action is adequate in amount and properly applied and removed, it contributes to the attainment of substantially complete balance without risk of motor overtravel and without the creation of a dead zone or dead spot of sufficient extent to be practically objectionable. While, as previously stated, the direct current and double frequency current components of the control winding current each contribute to a desirable motor damping action, efficient high speed operation of the rebalancing apparatus requires in many instances a greater damping effect than those current components provide. In a preferred form of the present invention, I obtain the additional motor damping action needed by utilizing the higher frequency current to control a feedback circuit through which a 60 cycle signal component of the current supplied to the motor control winding energizing circuit is fed back into the conversion amplifying system in such manner as to reduce, or even cancel the effect of the 60 cycle motor drive signal. The damping action thus obtained provides a desirable anticipatory control action.

The higher frequency current may be used in accordance with the present invention for other purposes than the damping of the rebalancing motor, and another specific object of the present invention is to provide means controlled by the higher frequency current which is effective to actuate a recording mechanism as soon as balance is obtained to provide so-called balance printing, as distinguished from cyclic printing. With balance printing, a record is selectively made of each of the variables being measured as soon as the instrument is balanced, while with cyclic printing a record of each of the measured variables is made only at regular, fixed intervals of time, the length of which intervals is determined by the characteristics of the instrument.

In cyclic printing, so that false points will not be recorded which will result if printing occurs while the instrument is not in balance, the printing cycle must be sufficiently long to permit the print wheel carriage to travel completely across scale between the printing of points on two consecutive records. This condition is necessary to permit accurate recording of two variables which may be widely spaced, or in an extreme case, where the record of one variable may be at the low end of the scale while the record of the next variable to be recorded is at the high end of the scale.

It will be noted that this requirement of cyclic printing unnecessarily lengthens the interval between the printing of consecutive records which may be reasonably close together and only require a fraction of the total printing cycle for the instrument to reach a new balanced condition. This consideration is important in those applications where the time required between the printing of consecutive records is too long for the results desired.

With cyclic printing, it is possible to shorten the interval between the printing of closely spaced records only by increasing the speed of the print wheel carriage across scale, inasmuch as the printing cycle is fixed by the maximum possible distance between records: namely, the time required for full scale travel. Increasing the speed of the print wheel carriage, however, increases the speed of other associated moving parts in the instrument and unnecessarily increases wear.

In accordance with the present invention, balance printing is employed for the purpose of speeding up the printing action without requiring a corresponding increase in the speed of the print wheel carriage and associated mechanism. To this end, the action of the printing mechanism is controlled by the measuring circuit so that printing will take place promptly upon the attainment of balance of the instrument. Consequently, there is no delay in printing or recording once the instrument is in balance.

Thus another specific object of the present invention is to provide means for utilizing the high frequency signal in the operation of a multiple measuring and recording balance printing instrument to actuate a recording element, or to actuate a selector switch, or to actuate both the recording element and the selector switch, as soon as balance is obtained in the measurement of the voltages of thermocouples or other sources of measurable voltages which the selector switch connects to the measuring apparatus, one after another, in predetermined order.

The various features of novelty which characterize my invention are pointed out with particularity in the claims annexed to, and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 1 is a diagrammatic representation of potentiometric measuring apparatus including a conversion type of amplifying and motor control system and my improved damping means;

Figs. 2, 3, 4, 5 and 6 are curves showing motor winding voltages and currents under different operating conditions.

Figure 7:
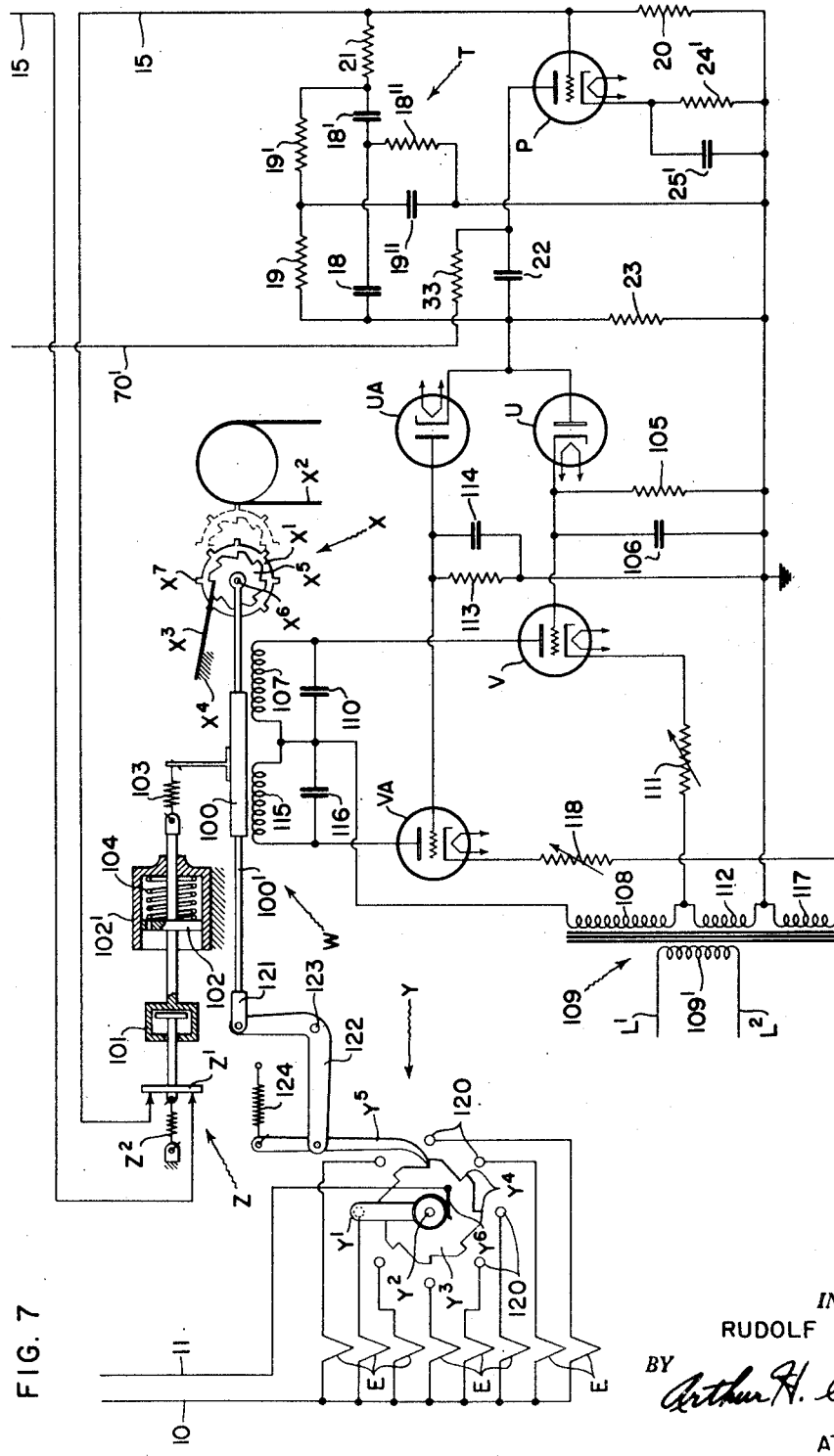
Fig. 7 is a diagram illustrating a form of the invention in which the double frequency current is utilized in controlling the actuation of the selector switch and recorder of a multiple point potentiometer.

In Fig. 1, I have diagrammatically illustrated the use of the present invention in potentiometric measuring and control apparatus of the so-called conversion type disclosed in said prior patent of Wills. In the apparatus shown, potentiometric rebalancing operations are effected by a reversible electric motor J and an automatic control system which controls the operation of the motor J and includes an electronic amplifier and means comprising a vibrator I and a transformer H cooperating to impress on the electronic amplifier an alternating control voltage varying in magnitude and phase with the magnitude and direction of potentiometer unbalance produced by a change in the voltage of a thermocouple E.

The apparatus shown diagrammatically in Fig. 1 comprises a potentiometric bridge circuit A including a slide wire resistance B along which a slider contact C is adjusted through a shaft J' which is rotated by the motor J and is in threaded engagement with a pen carriage D carrying the contact C. The potentiometric bridge circuit A is shown as of conventional type, comprising one branch including series connected resistances 1, 2 and 3, an energizing branch including a source of current 4 and a regulable resistance 5 connected in series, and a third branch connected in parallel with the energizing branch and with the first mentioned branch and including series connected resistances 6 and 7. The slide wire resistance B is connected in parallel with the resistance 1 between and in series with the resistances 2 and 3.

Associated with the bridge circuit A is a standardizing switch. The latter, as conventionally shown, comprises a movable two position switch member G and switch contacts G', G² and G³. In the normal operating position of the switch member G, it engages the contact G' and connects the thermocouple E and the input of the electronic amplifier in series between the slider contact C and the junction point F of the bridge resistances 6 and 7. In its recalibrating position, the switch member G engages and forms a bridge connection between the contacts G² and G³ and thereby connects a resistance 8 and a standard cell 9 in series with the bridge resistance 7. The circuit branch connecting the slider contact C and bridge point F includes in series between the slider contact C and standardizing switch contact G', a conductor 10, the thermocouple E and a conductor 11. The circuit connection between the switch contact G' and the bridge point F, which is closed by the movement of switch member G into engagement with the contact G', includes the switch member G, a conductor 12 connecting the switch member G to one terminal of the transformer H, a conductor 13 connecting a terminal of the vibrator I to the bridge point F, and conductors connecting the transformer H and vibrator I.

As is hereinafter more fully described, when the measuring circuit is unbalanced, the vibrator I and transformer H cooperate to impress an alternating current signal on an amplifying and motor drive system including twin triode thermionic tubes L, M and K. The two triode valves in the tube L and one valve in the tube M are signal voltage amplifiers. The second triode valve in the tube M is used as a rectifier valve. The frequency of said signal is the same as that of the source of alternating current energizing the vibrator I, and the phase relation of the signal to the voltage of said source depends upon whether the current flow through the thermocouple E is in one direction or the other. The signal amplified in the tubes L and M is impressed on the control grids of the two triode valves in the tube K, which serves as a motor drive tube through which the control winding 61 of the motor J is selectively energized in accordance with the magnitude of the signal and its phase relation to the voltage of said source of alternating current which energizes the power winding 60 of the motor as well as the vibrator I.

In respect to the various features shown in Fig. 1 to which specific reference has just been made, and which are hereinafter more fully described, the apparatus shown in Fig. 1 does not differ from that disclosed in said prior Wills patent, but the apparatus shown in Fig. 1 and collectively designated by the symbol O, was devised by me for use for the purpose of the present invention in the general manner illustrated in Fig. 1. The apparatus O shown in Fig. 1 comprises thermionic tubes P, Q, R, and S and circuit components designated by the numerals 15—35, inclusive, and was devised by me for use in the manner illustrated in Fig. 1 to inject a temporary 60 cycle braking signal into the input circuit of the amplifying valve in tube M through a conductor 16 when both 60 cycle and 120 cycle signals are transmitted to the apparatus O through a conductor 15 from the energizing circuit of the control winding 61 of the motor J.

The manner in which the motor J is normally controlled in accordance with the alternating current signal jointly created by the vibrator I and transformer H will be described in some detail, prior to further reference to the apparatus O. As previously stated, the conductor 13 is connected to one terminal of the vibrator I and conductor 12 is connected to one terminal of the transformer H. The last mentioned terminal is the midpoint or center tap of the primary winding of the transformer H which comprises two sections 41 and 42. The unjoined ends of the winding sections 41 and 42 are respectively connected through conductors 39 and 40 to contacts 46 and 47 respectively, of the vibrator I. Those contacts are located at opposite sides of the vibrating reed element 48 of the vibrator I. The latter constitutes the vibrator terminal which the conductor 13 connects to the bridge point F. The core structure and casing of the transformer H and a shield 43 interposed between the transformer primary windings and its secondary winding 44 are connected to a grounding conductor 45. The latter is also connected to the junction point of the primary winding sections 41 and 42 by a conductor 12'.

The vibrator reed 48 is caused to vibrate by a winding 49 having its terminals connected to a source of alternating current which may be the alternating current supply conductors L' and L². A permanent magnet 49' is associated with the reed 48 for polarizing and synchronizing purposes, and in operation the reed 48 is in continuous vibration at a frequency, assumed to be 60 cycles, which corresponds to that of the source of energization for the winding 49. In consequence, the currents flowing alternately through the winding sections 41 and 42 create alternating voltages in the secondary winding 44 well adapted for amplification in the electronic amplifier to the input terminals of which the terminals of the transformer secondary winding 44 are connected.

Said electronic amplifier comprises a motor drive section and an amplifying section, both of which receive energizing current from a transformer HA having its primary winding 50 connected to the supply conductors L¹ and L² and having three secondary windings 51, 52 and 53. The motor drive section of the electronic amplifier comprises the reversible motor J and the tube K. The amplifying section comprises the amplifying tubes L and M.

The motor J, as diagrammatically shown, comprises a rotor 54 mechanically coupled to the threaded shaft J', the rotation of which, as diagrammatically shown, simultaneously adjusts the contact C and the pen carriage D. The motor J has a pair of terminals 55 and 56 which are respectively connected to the alternating current supply conductors L¹ and L², and also has a second pair of terminals 58 and 59. The terminal 58 is connected to the midpoint 98 of the secondary winding 51, and the terminal 59 is connected to ground by a conductor 59'. For its intended use, the motor J may be of the form schematically shown in the drawings in which one pair of oppositely disposed field poles is surrounded by the winding 60 connected between the motor terminals 55 and 56, and in which the other pair of poles is surrounded by the winding 61 connected between the motor terminals 58 and 59. A condenser 57 of suitable value is connected in series between the motor terminal 55 and the supply conductor L'.

Due to the action of the condenser 57, the value of which is chosen so as to form a series resonant circuit with the power winding 60, the current flowing through the power winding 60 will be in phase with the voltage of the alternating current supply conductors L' and L². The current supplied to the control winding 61 will lead or lag by approximately 90° the voltage of the alternating current supply conductors L' and L². The windings 60 and 61 thus establish fields in the motor J which are displaced from one another approximately 90° in one direction or the other, depending upon whether the winding 61 is energized with current which leads or lags the voltage of the alternating current supply conductors L' and L² and the current in the power winding 60. As will become apparent from the subsequent description, the phase of the current flow through the winding 61 and the rotation of the rotor 54 depend upon, and are controlled by, the direction of unbalance of the potentiometric measuring circuit, and the duration of said rotation depends on the duration of said unbalance so that the rotation of the rotor tends to adjust the contact C to the extent as well as in the direction to rebalance said circuit.

The alternating voltage generated in the secondary winding 44 of the transformer H is amplified by the action of the amplifying tubes L and M, and the amplification thus effected is utilized in energizing the control winding 61 of the motor J to control the selective actuation of the latter for rotation of the rotor 54 in one direction or the other.

As shown, the electronic amplifying tube L includes two triodes within the same envelope, respectively designated by the reference symbols 63 and 64. The triode 63 includes anode, control electrode, cathode, and heater elements, and the triode 64 includes like elements. The heaters of the triodes 63 and 64 are connected in parallel and receive energizing current from the low voltage secondary winding 53 of the transformer HA. The conductors through which the secondary winding 53 supplies current to the heaters of the tube L and also to the heaters of the tubes M and K have not been shown in order not to confuse the drawings.

The electronic amplifying tube M includes two triodes, respectively designated by the reference characters 65 and 66, and within the same envelope. Both of the triodes of tube M include anode, control electrode, cathode and heater elements. The tube K also includes two triodes respectively designated by the reference characters 67 and 68, within the same envelope, and including anode, control electrode, cathode, and heater elements.

The triode 66 of the tube M is utilized as a half-wave rectifier to provide a source of direct current voltage for energizing the anode or output circuits of the triodes 63, 64 and 65. As shown, the control electrode and cathode of the triode 66 are directly connected together, and the circuit is energized by the transformer secondary winding 52 through connections which may be traced from the left end terminal of the winding 52, as seen in the drawings, through a conductor 69 to the anode of the triode 66, to the cathode thereof, and through a conductor 70 to the positive input terminal 75 of a filter generally designated by the reference numeral 71. The negative terminal 74 of the filter 71 is connected by a conductor 72 to the right end terminal of the transformer secondary winding 52, and the latter is connected by a conductor 85 to the grounded conductor 45.

The filter 71 includes a condenser 73 which operates to smooth out the ripple in the output voltage of the filter between the points 74 and 75. The filter 71 also includes a resistance 76 and a condenser 77 which operate to smooth out the voltage of the filter between the points 74 and 78. The filter 71 includes a further resistance 79 and a condenser 80 for smoothing out the output voltage between the filter points 74 and 81, the latter being the output terminals of the filter. The filter, therefore, comprises three stages. Such a three-stage filter is provided because, for satisfactory and efficient operation, it is desirable that the anode voltage supplied to the triode 63 be substantially free from ripple, whereas it is not necessary to supply anode voltage so completely free from ripple to the output circuits of the triodes 64 and 65.

The anode circuit of the triode 63 may be traced from the filter point 81, through a fixed resistance 82 to the anode of the triode 63, to the cathode thereof, and through a cathode biasing resistance 83, which is shunted by a condenser 84, to the negative filter point 74 through the previously mentioned grounded conductor 45, the conductor 85 and the conductor 72. The cathode biasing resistance 83 and the parallel connected condenser 84 are utilized for biasing the control electrode of the triode 63 negatively with respect to its associated cathode.

The input circuit of the triode 63 may be traced from the cathode through the parallel connected resistance 83 and condenser 84 to the grounded conductor 45, through the transformer secondary winding 44, and through a conductor 86 to the control electrode of the triode 63.

The output circuit of the triode 63 is resistance-capacity coupled to the input circuit of the triode 64 by means of a condenser 87 and a resistance 88. More particularly, the anode of the triode 63 is connected by the condenser 87 to the control electrode of the triode 64, and the control electrode of the triode 64 is connected through the resistance 88 to the grounded conductor 45 and thereby to the cathode of the triode 64. The anode circuit of the triode 64 may be traced from the positive terminal 78 of the filter 71 through a fixed resistance 89 to the anode of the triode 64, to the cathode thereof, and through conductors 45, 85 and 72 to the negative terminal 74 of the filter.

The output circuit of the triode 64 is resistance-capacity coupled to the input circuit of the triode 65 by means of a condenser 90 which is connected between the anode of the triode 64 and the control electrode of the triode 65 by a conductor 95', and by means of a resistance 91 which is connected between the control electrode of the triode 65 and the grounded cathode thereof. It is noted the resistances 88 and 91, which are connected to the input circuits of the triodes 64 and 65, respectively, operate to maintain the control electrodes of the triodes 64 and 65 at the same potentials as their associated cathodes when no voltage is induced in the transformer secondary winding 44, and upon the induction of an alternating voltage in the secondary winding 44, resistances 88 and 91 permit the flow of grid current between the control electrodes of the triodes 64 and 65 and their associated cathodes and thereby limit the extent the control electrodes of the triodes are permitted to go positive with respect to their associated cathodes. With the control electrode of triode 65 connected to the resistance 91 by an adjustable slider contact 91', as shown, said resistance and contact form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode, to the cathode thereof, and through conductors 45, 72, and 85 to the negative terminal 74 of the filter. The output circuit of the triode 65 is resistance-capacity coupled to the input circuit of the triodes 67 and 68 by means including a condenser 93 and a resistance 94.

Voltage is supplied the output circuits of the triodes 67 and 68 from the high voltage secondary winding 51 of the transformer HA. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through a fixed resistance 97 and the grounded conductor 59' to the terminal 59 of the motor J. The terminal 58 of the motor J is connected to the center tap 98 of the transformer secondary winding 51, as previously mentioned. Thus, the triodes 67 and 68 are utilized for supplying energizing current to the control winding 61 of the motor J from the winding 51.

The motor J is preferably so constructed that the winding 61, together with a condenser 99 of suitable value connected in parallel therewith, forms a parallel resonant circuit, the impedance of which is of the proper value to match the impedance of the anode circuits of the triodes 67 and 68 when the motor is operating, in order to obtain the most efficient operation. Preferably, the motor is so constructed that it has a high ratio of inductance to resistance, for example, of the order of 6–1 or 8–1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors $L^1$ and $L^2$ through the condenser 57. By virtue of the series resonant circuit thus formed, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors $L^1$ and $L^2$ because of the resonant circuit as previously explained. The voltage across the motor winding 60, however, leads the current by substantially 90° because of the inductance of the winding 60.

Energizing current is supplied to the parallel resonant circuit comprising the motor winding 61 and the condenser 99 from the transformer secondary winding 51 through the anode circuits of the triodes 67 and 68 and through the connections previously traced. This parallel resonant circuit presents a relatively high external impedance and a relatively low local circuit impedance. The relatively high external impedance is approximately the same as the impedance of the anode circuits of the triodes 67 and 68, and accordingly, provides efficient operation as explained hereinbefore. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, it may be assumed that the anode of the triode 67 is rendered positive with respect to the center tap 98, and during the following half cycle, the anode of the triode 68 may be assumed to be rendered positive with respect to the center tap. Accordingly, the triodes 67 and 68 are arranged to conduct on alternate half cycles of the alternating current supplied by the supply conductors $L^1$ and $L^2$.

When no signal is impressed upon the control electrodes of the triodes 67 and 68, pulsating unidirectional current of twice the frequency of the alternating voltage supplied by conductors $L^1$ and $L^2$ is impressed on the motor control winding 61. When thus energized, the motor J is not urged for rotation in either direction but remains stationary. Due to the relatively high direct current component of the current then flowing through the motor winding 61, the core structure of the motor winding 61 will be saturated. As previously explained, the condenser 99, in shunt to the motor winding 61, is so chosen that the condenser and motor winding provide a parallel resonant circuit. This saturation of the core structure of the motor J operates to exert somewhat of a damping effect on the rotor 54, or in other words, an effect tending to prevent rotation of the rotor 54. Consequently, if the rotor 54 has been rotating, saturation of the motor core structure operates to tend to stop the rotation.

When an alternating grid bias is impressed on the control electrodes of the triodes 67 and 68, the magnitude of the pulses of current flowing in the anode circuit of one triode 67 or 68 will be increased, while the magnitude of the pulses of current flowing in the anode circuit of the other triode 68 or 67 will be decreased. Accordingly, the pulses of unidirectional current supplied to the motor winding 61 during certain halves of the cycles will predominate over those supplied the motor winding during the other half cycles. Which anode current will be increased depends upon whether the bias voltage is in phase with, or 180° out of phase with, the voltage of supply conductors $L^1$ and $L^2$.

Such energization of the motor winding 61 operates to introduce therein an alternating component of current of the same frequency as that supplied by the alternating current supply conductors $L^1$ and $L^2$. This alternating component of current will either lead or lag by approximately 90° the alternating current flowing through the motor winding 60, depending upon which of the triodes 67 and 68 has its anode current increased by the prevailing grid bias. With either phase relation, the two currents produce a magnetic field in the motor core structure which rotates in one direction or the other, depending upon said current phase relation, and which effects rotation of the motor rotor 54 in the corresponding direction. Moreover, when the motor winding 61 is so energized, the direct current component of the current flowing therein is decreased, and consequently, the saturation of the motor core structure is decreased with the result that the rotor damping effect is reduced.

In normal operation, the motor drive signal impressed on the control electrodes of the triodes 67 and 68 through the conductor 95 and condenser 93 is dependent in magnitude and phase upon the magnitude and direction of the pulsating current flow through the circuit including the thermocouple E, vibrator I and primary winding sections 41 and 42 of the transformer H. When the temperature of the thermocouple E is steady and the positions of the pen carriage D and contact C are correct for that temperature, no motor drive signal is transmitted to the control electrodes of the triodes 67 and 68, and the rotor 54 of the motor J then has no tendency to rotate. When the measuring system is unbalanced, if the unbalance is due to an increase in the temperature of the thermocouple E, a motor drive signal will be transmitted from the anode circuit of the triode 65 to the control grids of the triodes 67 and 68 which will result in a rotation of the motor J moving the pen carriage D and slider contact C up-scale. Conversely, when the system is unbalanced by a decrease in the thermocouple temperature, the motor will give the pen carriage a down-scale adjustment.

Characteristics of the voltages and currents in the tube K and in the power and control windings 60 and 61 of the rebalancing motor J under different operating conditions are shown by curves in Figs. 2, 3, 4, 5 and 6. Those curves show voltages and currents plotted along a time axis as follows:

Curves $eg$ show the control grid-cathode voltage of the motor drive triodes 67 and 68;

Curves $ea$ show the plate-cathode voltage of the triode 67;

Curves $eb$ show the plate-cathode voltage of the triode 68;

Curves $ia$ show the plate current of the triode 67;

Curves $ib$ show the plate current of the triode 68;

Curves $ec$ show the voltage across the motor control winding 61;

Curves $ic$ show the alternating component of current in the motor control winding 61;

Curves $id$ show the direct component of current in the motor control winding 61;

Curves $e$ show the voltage across the motor power winding 60;

Curves $i$ show the current in the motor power winding 60; and

Curves $es$ show the voltage between the supply conductors $L^1$ and $L^2$.

The above curves are shown for the following operating conditions of the system:

Fig. 2—Balanced system;
Fig. 3—Small temperature increase;
Fig. 4—Large temperature increase;
Fig. 5—Small temperature decrease; and
Fig. 6—Large temperature decrease.

In large part, the curves shown in Figs. 2–6 are believed to be self explanatory when considered in the light of the legends associated with the curves. Since the condenser 51 causes the voltage $e$ across the motor power winding 60 to lead the voltage between the supply conductors $L^1$ and $L^2$ by approximately 90°, the power winding current, shown by the curve $i$, lags the voltage $e$ by approximately 90°, as shown. The curves $e$ and $i$ vary in amplitude from their minimum values, shown in Fig. 2, which exist when the measuring system is balanced and when the motor J is at rest, progressively increasing as the motor speed increases regardless of the direction of motor rotation, as shown in Figs. 3 to 6, inclusive.

The curves $eg$, showing the control grid-cathode voltage for the valves 67 and 68, illustrate the fact that when the system is balanced the grid voltage is zero, and that when the system is unbalanced the grid voltage $eg$ is an alternating voltage of a magnitude increasing with the extent of unbalance. The curves $eg$ also show that the voltage $eg$ is in phase with, or is 180° out of phase with the supply voltage $es$, accordingly as the unbalance is due to a temperature decrease or to a temperature increase, respectively.

Th curevs $ia$ and $ib$ are illustrative of the fact that the valves 67 and 68 can be conductive only during the alternating periods in which their respective anodes are positive, and of the further fact that the conductivity of either valve, when its anode is positive, depends upon the grid potential of the valve. In the balanced condition of Fig. 2, the plate currents of the two valves have the same values. When the temperature being measured increases, the current $ia$ decreases and the current $ib$ increases. When the temperature increase is sufficiently large the curve $ia$ diminishes to zero. Conversely, on a temperature decrease the current $ia$ increases and the current $ib$ decreases, and the latter attains its zero value when the temperature decrease is relatively large.

The voltage and alternating current curves $ec$ and $ic$, respectively, for the motor control winding 61, are plainly illustrative of the fact that in the balanced condition of the apparatus, the voltage and alternating current frequencies in the control winding are double the supply voltage frequency. Those voltage and current frequencies are each equal to the supply line voltage frequency when the temperature increase or decrease is relatively great so that the motor operates at relatively high speed. When the temperature increase or decrease and the resultant measuring circuit unbalance are each relatively small, the control winding voltage ec and the alternating current component ic each includes both an alternating 60 cycle component and an alternating double frequency or 120 cycle component. Those 60 cycle voltage and current components are each confined wholly or mostly to the half cycle in which the valve 68 is the more conductive, when the unbalance is due to a temperature increase, and are confined wholly or mostly to the other half cycle when the unbalance is due to a temperature decrease, and the valve 67 is more conductive than the valve 68.

For the purposes of the present invention, the voltage and current conditions which exist when the measuring system is slightly unbalanced are of primary importance. The double frequency and normal frequency components prevailing are both required to enable the apparatus O to serve its intended purpose. That purpose requires the detection of the 120 cycle voltage component of the motor control winding voltage and its utilization in controlling the feedback circuit, and the 60 cycle component of the motor control winding voltage must be present to enable the feedback circuit to produce its intended motor damping effect by injecting a 60 cycle signal back into the input circuit of the valve 65.

The character of the apparatus O and the manner in which it operates to accomplish its purpose will now be described.

For the purpose of utilizing the double frequency component of the motor winding voltage, use is made of the triode P. The latter has its control grid connected through a condenser 17 and the conductor 15 to the terminal 58, through which the motor control winding 61 is connected to the center-tap or mid-point 99 of the transformer secondary winding 51. Between the anode and the control grid of triode P, a feedback path is provided which includes a resistance-capacity network T, comprising two condensers 18 and 18' connected in series with one another and two resistances 19 and 19' connected in series with one another and in parallel with the condensers 18 and 18'. The junction point between the condensers 18 and 18' is connected to ground through a resistance 18'', and the junction point between the resistances 19 and 19' is connected to ground through a condenser 19''. The control grid of the tube P is connected to ground through a resistance 20 and is connected to the network T by a resistance 21. As will be recognized, the network T is a conventional frequency selective arrangement which is adapted to permit the double frequency, 120 cycle, voltage component, when present, to be passed and amplified, and to attenuate any accompanying 60 cycle component of the motor control winding voltage.

For the detection of the double frequency voltage component and the derivation therefrom of a unidirectional voltage, use is made of a diode Q and resistance 23. Said diode has its anode connected to the anode of the triode P by a condenser 22, and the resistance 23 has one end directly connected to the anode of the diode Q and has its other end connected to ground. The cathodes of the valves P and Q are also connected to ground as follows: the ground connection to the cathode of the diode Q is formed by a load resistance 24 and associated parallel-connected by-pass condenser 25, and the ground connection to the cathode of the triode P includes a resistance 24' and a parallel-connected by-pass condenser 25'. The resistance and capacity values of the resistance 24 and condenser 25 are so chosen that they cooperate with the diode Q to form a peak detector.

For the purpose of differentiating the unidirectional voltage developed across the resistance 24, a condenser 26 and an adjustable resistance 27 are provided. The condenser 26 has one terminal connected to the ungrounded end of the resistance 24 and has its other terminal connected to ground through the adjustable resistance 27. The desired differentiating action obtained with the differentiating network including the condenser 26 and resistance 27 is a sudden voltage surge or pulse across the resistance 27 which makes the ungrounded end of that resistance positive relative to its grounded end. That voltage surge is of such brief duration that it may be described as practically momentary. It results from the rapid increase in the unidirectional voltage produced across the resistance 24 as the double frequency current delivered to the motor control winding 61 rapidly builds up when measuring circuit balance is being closely approached and the 60 cycle drive signal is rapidly decreasing. The rapid increase in voltage across the resistance 24 is not attended by an equally rapid increase in the voltage across the condenser 26. In consequence, there is a brief flow of a relatively large condenser charging current to ground through the resistance 27, producing the above mentioned voltage surge or pulse across that resistance. The capacity and resistance values of the condenser 26 and resistance 27 are so proportioned as to secure the desired differentiating action.

When the measuring circuit is unbalanced and the double frequency current delivered to the motor winding 61 rapidly dies out, the differentiating network produces a differentiating effect which is the converse of that described, in that it results in a sudden rush of condenser discharging current through the resistance 27, in the direction to make the ungrounded end of that resistance negative relative to its grounded end. For selective utilization of the positive differentiated pulses only, use is made of the diode R and a load resistance 28, the latter connecting the cathode of that diode to ground. The anode of the diode R is connected to the ungrounded end of the resistance 27, which is also connected to the corresponding terminal of the condenser 26.

A feedback circuit is provided for feeding a portion of the voltage across the control winding 61 of the motor J back into the electronic amplifier through the conductor 16. The latter connects the apparatus O to the input circuit of the valve 65 of the tube M. That feedback circuit includes a control triode S. The latter has its output circuit connected to the conductor 16, as shown, and has its control grid connected directly to the cathode of the diode R, which in turn is connected to ground through the resistance 28. Said control grid is also connected by a coupling condenser 29 and a potentiometer resistance 30 to the terminal 58 of the control winding 61 of the motor J. As shown, one terminal of the resistance 30 is connected to ground, and thereby to the terminal 59 of the winding 61 through the conductor 59'. The cathode of the tube S is normally biased to cut-off by an adjustable connection to a potentiometer resistance 31 which has one terminal connected to ground and has its other terminal connected to a conductor 70' which in turn is connected to the conductor 70 through which the rectifier valve 66 of the tube M supplies plate current to the valves 63, 64 and 65. Through the conductor 70' and resistances 32 and 33, respectively, the valve 66 also supplies plate current to the triodes S and P.

The feedback circuit is completed through a coupling condenser 33', a potentiometer resistance 34, an isolation resistance 35, and the conductor 16, connected in series. The coupling condenser 33' has one terminal connected to the anode of the tube S and to the corresponding end of the resistance 32. The second terminal of the condenser 33' is connected to ground through the potentiometer resistance 34. One end of the resistance 35 is connected through a slider contact 34' to the resistance 34 at an adjustable point along the length of the latter, and the second end of the resistance 35 is connected by the conductor 16 to a point in the input circuit of the valve 65 of the tube M between the condenser 90 and the resistance 91 in that circuit.

In the operation of the system shown in Fig. 1, the close approach of the previously unbalanced measuring circuit to its balanced condition results in the appearance in the motor control winding 61 of the double frequency, or 120 cycle, voltage and current components of the curves *ic* and *ec* which are shown in Figs. 3 and 5. The magnitude of the double frequency components increases as the departure from complete balance is reduced. Prior to the attainment of complete balance, the voltage across the motor control winding 61 also includes a 60 cycle component, as is shown in Figs. 3 and 5. That component provides a motor drive action which continues after the double frequency signal is detectable by the apparatus O. Due to the provision of the frequency selective network T in the feedback circuit controlled by the triode P, only the double frequency voltage component appears across the resistance 23. The unidirectional voltage then appearing across the resistance 24 increases in magnitude in accordance with the increase in amplitude of the double frequency component of the voltage across the motor control winding 61. Since that component increases rapidly, it produces a sharp increase in the unidirectional voltage across the resistance 24. By differentiating that increase by means of the differentiating network comprising the condenser 26 and resistance 27, a positive pulse is impressed on the control grid of the tube S, which makes that tube conductive.

The tube S then amplifies and passes the signal which it has received from the control winding 61 of the motor J through the conductor 15 into the input circuit of the valve 65 through the condenser 33', potentiometer 34, isolation resistance 35 and conductor 16. The 60 cycle component of the voltage thus injected into the electronic amplifier through the valve S is of such phase as to oppose the 60 cycle motor drive signal received by the valve 65 from the output circuit of the valve 64. The feedback signal may be strong enough to eliminate or reverse temporarily the motor drive signal received from the output circuit of the valve 64, or may be only strong enough to reduce the magnitude of that signal. In the latter case it damps and slows down but does not interrupt the rotation of the motor J, and thus contributes directly to reduction in motor overtravel and hunting. When the feedback signal is of greater amplitude, it may even temporarily stop the motion of the motor before full balance is attained. Hence, it provides a practically important anticipatory control.

As the feedback signal acts to oppose the motor drive signal and thereby damps the motor, the rate of increase of the double frequency voltage developed across the resistance 23 decreases. Consequently, the rate of increase of the voltage developed across the resistance 24 decreases, this voltage approaching its normal, balanced state value. As a result, the positive pulse applied to the control grid of the control tube S decays, as the condenser 26 becomes fully charged, so that the latter tube S promptly returns to its cut-off condition. This allows the motor J to drive slowly into balance and assures full system sensitivity in the balanced condition of the apparatus. When, thereafter, the measuring system shown in Fig. 1 passes from its balanced condition into an unbalanced condition, the 120 cycle voltage component across the winding 61 disappears. This creates a negative pulse across the resistance 27 as the condenser 26 discharges, but such a negative pulse cannot pass through the diode R and hence cannot reach the control grid of the tube S.

The feedback signal injected into the input circuit of the valve 65 includes a double frequency component as well as a 60 cycle component, but the 120 cycle signal thus injected into the electronic amplifying system is of no consequence since it does not affect the motor drive and is injected at a time at which the total signal undergoing amplification is small so that there is then no tendency to overload or block the valve 65.

As previously pointed out, the present invention comprises means for utilizing the double frequency voltage component developed across the control winding of the rebalancing motor J, as balance is obtained, for other purposes than the damping of the rebalancing motor. Thus, as is shown by way of example in Fig. 7, the present invention may be used in actuating the printing mechanism and selector switch mechanism of a multi-recording self balancing potentiometer of the balance printing type.

As previously mentioned, the balance printing type of multiple recorder is superior to the cyclic printing type for applications wherein the variables being measured are rapidly changing. In the balance printing recorder, a record is made each time the instrument is balanced, with the result that rapid changes in the measured variables are recorded, whereas in the cyclic printing recorder, successive records are made only at regular, fixed intervals, these intervals being dependent on the maximum time required to obtain balance in the instrument after a maximum change in one of the measured variables, and often being of such long duration as to make impossible the recording of rapid changes in these variables.

The apparatus shown in Fig. 7 includes nothing corresponding to the means shown in Fig. 1 through which the potential across the resistance 23 controls the injection of a damping signal into the input circuit of the valve 65, but it does include the triode P and all connections thereto except the diode Q. In respect, moreover, to the potentiometric measuring circuit, the rebalancing motor and the amplifying and control system through which the operation of the rebalancing motor is controlled, the apparatus shown in part in Fig. 7 may be and is assumed to be identical with the apparatus shown diagrammatically in Fig. 1. To simplify the illustration, Fig. 7 illustrates no portions of the measuring and amplifying apparatus shown in Fig. 1, except the thermocouple lead conductors 10 and 11 and the triode P and its connections including the frequency discriminating network T and the resistance 23.

In Fig. 7, the double frequency unidirectional voltage developed across the resistance 23 is utilized in an electronic amplifying and control system including diode valves U and UA and triode valves V and VA, to control an intermittently operating relay W. In the course of each intermittent operation, the relay operates a recording mechanism X to record the value of a quantity measured, a selector switch mechanism Y to disconnect one thermocouple or other source of voltage from the measuring circuit and to connect another thereto, and a switch mechanism Z to thereby insure proper completion of the relay operating cycle.

As shown in Fig. 7, the relay W is of the electromagnetic type comprising a reciprocating armature or core member 100, and longitudinally displaced windings 107 and 115 alternately energized as herein after described, to hold the armature in one or the other of two longitudinally displaced positions. The switch Z includes a movable switch member Z' which is movable between a normal position in which it closes a gap in the conductor 15 and a second position in which it opens that gap. The opening and closing movements of the switch member Z' result from, but do not occur simultaneously with, the corresponding to and fro movements of the member 100, being delayed somewhat for purposes hereinafter explained. As diagrammatically illustrated, the switch member Z' is biased to its closed position by a light spring $Z^2$ and is given belated movements as a result of a lost motion connection 101 between the member Z' and a dashpot piston 102. The piston 102 works in a stationary dashpot cylinder 102', and is connected to the armature 100 through a relatively stiff spring 103. A relatively light spring 104 biases the piston 102 for movement relative to the dashpot cylinder, in the direction to move the switch member Z' into its closed position. When the armature 100 is in its left-hand normal or rest position, the spring 104 holds the piston 102 in the position in which the switch member Z' is in its closed position and the lost motion connection 101 is in its contracted condition. When the member 100 is moved to its right-hand position, the dashpot action of the cylinder 102' and piston 102 prevents simultaneous movement of the piston to the right. The spring 103 then put under tension thereafter moves the piston 102 slowly to the right as air is forced out of the closed end of the dashpot cylinder 102'. The movement thus given the dashpot piston first elongates the lost motion connection 101 and then moves the switch member Z' to its open position. The light spring $Z^2$ insures that the expansion of the lost motion connection will invariably precede the movement of the switch member Z' to its open position. When the member 100 is returned to its rest position, the closing movement of the switch member Z' is retarded by the dashpot action until the spring 104 gives the piston 102 the necessary motion to the left. After the switch member Z' moves into its closed position, the movement of the piston 102 under the action of the spring 104 continues until the lost motion connection 101 is contracted.

In the contemplated operation of the apparatus shown in Fig. 7, the transmission of a double frequency, or 120 cycle, signal through the conductor 15 to the triode P and network T results in the development of a 120 cycle voltage across the resistance 23. The detection and amplification of that voltage effects the energization of the winding 107 of the relay W, and thereby moves the relay member 100 to the right and gives a retarded opening movement to the switch member Z'. The opening movement of the member Z' deenergizes the winding 107 and thereby initiates the return movements of the member 100 and switch member Z', and the simultaneous energization of the relay winding 115.

The appearance of the double frequency voltage signal across, and its disappearance from the resistance 23 causes the armature 100 to move to the right and left, respectively, through the detector and control circuit arrangement shown in Fig. 7. The diode U has its anode connected to the ungrounded end of the resistance 23, and has its cathode connected to ground through a resistance 105 and a by-pass condenser 106, connected in parallel therewith. The cathode of diode U is also connected to the control grid of the triode V. The plate circuit of the triode V includes the previously mentioned relay winding 107, the secondary winding 108 of a transformer 109, and a variable sensitivity resistance 111. The winding 107 is shunted by a condenser 110. The transformer 109 has its primary winding 109' connected to supply conductors L' and $L^2$ which ordinarily are branches of the supply conductors supplying low frequency energizing current for the measuring and amplifying system and the motor J. The cathode of the triode V is connected to ground through the variable resistance 111 and a second secondary winding 112 of the transformer 109, the ungrounded end of which is connected to the junction between the winding 108 and the resistance 111.

A second diode UA has its cathode connected to the ungrounded end of the resistance 23 and has its anode connected to ground through a load resistance 113 which is shunted by a by-pass condenser 114. The anode of the diode UA is also connected to the control grid of the triode VA. The plate circuit of the triode VA includes the second winding 115 of the relay W, which, when the winding 115 is energized, maintains the armature 100 in its left-hand position. The winding 115 is shunted by a by-pass condenser 116. The plate circuit of the triode VA also includes the previously mentioned transformer secondary windings 108 and 112 and a third secondary winding 117 of the transformer 109. A sensitivity control variable resistance 118 is interposed between the cathode of valve VA and the transformer secondary winding 117.

In operation, the valve VA is conductive when no double frequency, or 120 cycle, signal is being transmitted by the conductor 15 to the triode P and network T, hence the relay winding 115 is energized, and the armature member 100 is held in its left-hand position. The triode V is then non-conductive so that the relay winding 107 is deenergized and the armature member 100 is not urged from its left-hand or rest position. When a 120 cycle signal is transmitted by conductor 15 to the triode P and network T, a negative voltage is developed across the load resistance 113 by the action of the diode UA and applied to the control grid of the tube VA cutting off that tube and thereby deenergizing the relay winding 115. At the same time a positive voltage is developed across the load resistance 105 by the action of the diode U and applied to the control grid of the valve V. This makes the valve V conductive, energizes the winding 107, and thus moves the relay member 100 to the right.

The member 100 is operatively connected to the print wheel element X' of the recorder mechanism X so that movement of the member 100 to the right moves the print wheel X' into recording engagement with the record chart X² as is indicated in dotted lines of Fig. 7. When the winding 107 is subsequently deenergized and the winding 115 is again energized, the resultant movement of the member 100 to the left returns the print wheel X' to its normal position, shown in full lines in Fig. 7. As the print wheel is moved from its dotted line position back to its full line position, a spring pawl X³ anchored at X⁴, engages a tooth of a ratchet wheel X⁵ carried by the shaft X⁶ of the print wheel X' and gives the latter an angular adjustment. That adjustment turns the peripheral print wheel marking element X⁷ which has just engaged the chart X² out of register with the latter, and turns the following printing element X⁷ into position to engage the record chart X² when the armature 100 is next moved to the right.

The previously described means through which the movement of the relay member 100 gives a delayed opening movement to the switch member Z' insures time for good printing contact of the appropriate marking element X⁷ with the record chart X², followed by a suitably prompt return movement of the member 100 to its rest position. Thus, as soon as the switch member Z' opens the gap in the conductor 15, the latter ceases to transmit the double frequency signal to triode P and network T, whereupon valve V becomes non-conductive and valve VA becomes conductive. This deenergizes the winding 107 and re-energizes the winding 115, and effects the return of the member 100 to its normal left-hand position in which the printing wheel X' is out of engagement with the record chart X². After a brief interval following the movement of the relay member 100 to the left, the switch member Z' is returned to its closed position by the conjoint action of the springs Z² and 104.

In the arrangement diagrammatically illustrated in Fig. 7 the return movement to the left of the relay member 100 actuates the selector switch Y to disconnect the thermocouple E previously connected to the measuring circuit, and to connect another thermocouple E into the measuring circuit. As diagrammatically shown, the selector switch Y comprises a circular series of stationary switch contacts 120 each of which is respectively connected to one terminal of a corresponding one of the series of thermocouples E which are to be successively connected to the measuring circuit through the conductors 10 and 11. The switch Y as diagrammatically shown, comprises a contact arm Y' secured to an intermittently rotated shaft Y². The shaft Y² carries a ratchet wheel Y³ which has teeth Y⁴ and is advanced one tooth on each return movement to the left of the relay member 100. Each such angular movement of the ratchet wheel Y³ moves the contact Y' in the clockwise direction and out of engagement with the contact 120 previously engaged, and into engagement with an adjacent contact 120. Each contact 120, when engaged by the contact arm Y', is connected to the measuring circuit through the conductor 11 which is connected to a brush Y⁶ engaging the hub portion of the contact arm Y'.

As shown, the plunger 100, on each of its movements to the left, advances the ratchet wheel Y³ one tooth through a pawl Y⁵ successively engaging the teeth Y⁴, and a lever and link arrangement connecting the pawl Y⁵ to the member 100. The lever and link arrangement in Fig. 7 diagrammatically illustrated includes a link 121 to one end of which the stem portion 100' of the relay member 100 is connected. The other end of the link 121 is connected to one arm of a bell crank lever 122 pivoted at 123 and having its second arm pivotally connected to the stem or shank of the pawl Y⁵. The latter is biased into its tooth-engaging position by a spring 124.

As will be readily apparent to those skilled in the art, the apparatus shown in Fig. 7 includes relatively simple and effective means for insuring the operation of the recording and selector switch mechanisms of a multiple measuring and self balancing instrument as soon as the measuring circuit is balanced in the course of each measuring operation.

The generic idea of deriving a braking signal of opposite phase to the motor drive signal from an electronic amplifying and motor drive network of the type disclosed herein and feeding said braking signal back into said network as balance is approached in each operation of the rebalancing motor is disclosed and is generically claimed in the joint application, Serial No. 678,257, of Lloyd B. Cherry and myself filed concurrently with this application and now issued as Patent No. 2,457,792 of December 28, 1948. Subject matter herein disclosed, but not herein claimed, is disclosed and claimed in the copending applications of Jack A. Caldwell, Serial No. 678,394, and of Herbert A. Clarke, Serial No. 678,254, now Patent No. 2,457,794, of December 28, 1948, both filed of even date herewith.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Self-balancing measuring and control apparatus comprising in combination a normally balanced circuit adapted to be unbalanced by a change in a controlling condition, an electronic amplifying network, means responsive to unbalance in said circuit for impressing on said network an alternating current motor drive signal which is of a predetermined frequency and of a phase depending upon the direction of circuit unbalance and which fades away as circuit balance is closely approached and attained in a subsequent rebalancing operation, a reversible rebalancing motor having a control winding, means through which said network supplies current to said winding of said frequency and of a phase and magnitude depending on the phase and magnitude of said signal for operation of said motor to rebalance the said circuit, and through which said network supplies current of higher frequency to said winding as said signal fades away, and control means including frequency discriminating means connected to said control winding for producing a control effect when said current of higher frequency appears in said winding.

2. Self-balancing apparatus as specified in claim 1, in which said control means comprises means for subjecting said motor to a braking effect by injecting into said network a braking signal as said motor drive signal is fading away.

3. Apparatus as specified in claim 1, comprising an intermittently operable recording device, and means controlled by said control means for operating said recording device when said current of higher frequency appears in said winding.

4. Apparatus as specified in claim 1, comprising a selector switch intermittently operable to successively connect a plurality of voltage sources, one at a time in regular sequence, into said measuring circuit, and means actuated by said control means to operate said selector switch when said current of higher frequency appears in said winding.

5. Self-balancing measuring and control apparatus comprising in combination a normally balanced circuit adapted to be unbalanced by a change in a controlling condition, an electronic amplifying network, means responsive to unbalance in said circuit for impressing on said network an alternating current motor drive signal which is of a predetermined frequency and of a phase depending upon the direction of circuit unbalance and which fades away as circuit balance is closely approached and attained in a subsequent rebalancing operation, a reversible rebalancing motor having a control winding, means through which said network supplies current to said winding of said frequency and of a phase and magnitude depending on the phase and magnitude of said signal for operation of said motor to rebalance the said circuit, and through which said network supplies current of double said frequency to said winding as said signal fades away, and control means including frequency discriminating means connected to said control winding for producing a control effect when said current of double frequency appears in said winding.

6. The combination of an electronic amplifying system of the type comprising an input portion operative to amplify an alternating current signal of varying amplitude and of predetermined frequency and of either of two predetermined phases displaced 180° from one another, and an output portion operative to supply alternating current of the same frequency as the signal amplified when said signal is relatively large, and to supply alternating current of double said frequency when said signal is relatively small or non-existent, a device comprising a winding included in said output portion and actuated by the current of said predetermined frequency supplied by said output portion, and frequency discriminating means connected to said output portion and actuated by current of said double frequency but not by current of the first mentioned frequency.

7. The combination of an electronic amplifying system of the type comprising an input portion operative to amplify an alternating current signal of varying amplitude and of predetermined frequency and of either of two predetermined phases displaced 180° from one another, and an output portion operative to supply alternating current of the same frequency as the signal amplified when said signal is relatively large, and to supply alternating current of higher frequency when said signal is relatively small or non-existent, a device comprising a winding included in said output portion and actuated by the current of said predetermined frequency supplied by said output portion, and frequency discriminating means connected to said output portion and actuated by current of said higher frequency but not by current of the first mentioned frequency.

8. The combination of an electronic amplifying system of the type comprising an input portion operative to amplify an alternating current control signal of varying amplitude and of predetermined frequency and of either of two predetermined phases displaced 180° from one another, and an output portion operative to supply alternating current of the same frequency as the signal amplified when said signal is relatively large, and when said signal is relatively small to supply alternating current including a component of the first mentioned frequency and a component of higher frequency, a reversible motor normally operating in a direction and with a speed respectively dependent on the phase and amplitude of said control signal, frequency discriminating means connected to said output portion and actuated by currents of said higher frequency but not by currents of the first mentioned frequency, and motor damping means controlled by said discriminating means and operating when said discriminating means is actuated to derive a braking signal opposite in phase to said control signal from alternating current of the said predetermined frequency supplied by said output circuit and to feed said braking signal back into said input portion.

9. The combination of an electronic amplifying system of the type comprising an input portion operative to amplify an alternating current control signal of varying amplitude and of predetermined frequency and of either of two predetermined phases displaced 180° from one another, and an output portion operative to supply alternating current of the same frequency, or to supply alternating current of double said frequency accordingly as said signal is or is not relatively large, a device comprising a winding included in said output portion and actuated by the current of said predetermined frequency supplied by said output portion, and frequency discriminating means connected to said output portion and actuated by currents of said double frequency but not by currents of the first mentioned frequency.

10. An electrical network for use with an alternating current supply circuit providing alternating current of predetermined frequency, including a pair of electronic valves having output circuits connected in opposite phase relation to said alternating current supply circuit and having input circuits upon which a controlling voltage having an alternating component of said predetermined frequency is adapted to be impressed to increase the conductivity of one of said valves and to decrease the conductivity of the other of said valves and thereby cause alternating currents to flow in said output circuits which have said predetermined frequency when the conductivities of the two valves differ substantially, and which include components having a frequency double the first mentioned frequency when the conductivities of the two valves differ only slightly, a device comprising a winding included in each of said output circuits and actuated by the currents of said predetermined frequency flowing in said output circuits, and means for creating a control effect on the appearance of double frequency currents in said output circuits comprising frequency discriminating means connected to said output circuits.

11. In self-balancing apparatus, the combination of a rebalancing motor having a control winding, an electronic amplifying and motor drive system adapted to supply alternating current of a predetermined relatively low frequency to said control winding and of a phase and magnitude depending on the phase and magnitude of an alternating current control signal impressed on said system and to supply alternating current of a higher frequency to said winding when said signal fades away, and means for injecting into said system a braking signal of the same frequency as, but opposite in phase to, said control signal, said means comprising a feedback circuit including an electron discharge device having an anode, a cathode, and a control electrode, and biased to cut-off, said control electrode being coupled by a condenser to said control winding and said anode being connected to said amplifying system by a coupling condenser and an isolation resistance, and comprising means for making said electron discharge device conductive when current of said higher frequency as well as current of said low frequency is supplied to said control winding, said last mentioned means comprising a second electron discharge device having a control electrode coupled by a condenser to said control winding, and having an anode coupled to the control electrode of said first mentioned electron discharge device.

12. Apparatus as specified in claim 11, including a low frequency attenuator connected between the control electrode and anode of said second electron discharge device.

13. Apparatus as specified in claim 11 in which the coupling connection between the two electron discharge devices includes a third electron discharge device having an anode connected to the anode of said second electron discharge device and having a cathode connected to the control electrode of the first mentioned electron discharge device.

14. Apparatus as specified in claim 11 in which the coupling connection between the two electron discharge devices includes a third electron discharge device having an anode connected to the anode of said second electron discharge device and having a cathode connected to the control electrode of the first mentioned electron discharge device by a differentiating network including a resistance having one end connected to the cathode of said third electron discharge device and a condenser connecting the other end of said resistance to the cathode of said third electron discharge device.

15. Apparatus as specified in claim 11 in which the coupling connection between the two electron discharge devices includes a third electron discharge device having an anode connected to the anode of said second electron discharge device and having a cathode connected to the control electrode of the first mentioned electron discharge device by a differentiating network including a resistance having one end connected to the cathode of said third electron discharge device and a condenser connecting the other end of said resistance to the cathode of said third electron discharge device, and a fourth electron discharge device having an anode connected to the ungrounded end of said resistance and having a cathode connected to the control electrode of the first mentioned electron discharge device.

16. In self-balancing apparatus, the combination of a rebalancing motor having a control winding, an electronic amplifying and motor drive system adapted to supply to said control winding a current having a predetermined and relatively low frequency and of a phase and magnitude depending on the phase and magnitude of an alternating current control signal being impressed on said system, and to supply alternating current of a higher frequency to said winding when said signal fades away, a relay mechanism including an energizable winding and operating to produce one effect, or a reverse effect, as said relay winding is energized or deenergized, respectively, and means for energizing said relay winding in response to the presence of alternating current of said higher frequency in said control winding including an electron discharge device having an anode and a cathode, a condenser connecting the anode of said electron discharge device to said control winding, a second electron discharge device having a control electrode connected to the cathode of said first mentioned electron discharge device, an energizing circuit, and means connecting said energizing circuit and said winding in the plate circuit of said second electron discharge device.

17. In self-balancing apparatus, the combination of a rebalancing motor having a control winding, an electronic amplifying and motor drive system adapted to supply to said control winding a current at a predetermined and relatively low frequency and of a phase and magnitude depending on the phase and magnitude of an alternating current control signal impressed on said system, and to supply alternating current of a higher frequency to said winding when said signal fades away, a relay mechanism including two separately energizable windings and operating to produce one effect, or a reverse effect, as one or the other of said relay windings is energized, frequency discriminating means responsive to the frequency of the current in said control winding, and associated apparatus means for energizing one of said relay windings in response to the presence of alternating current of said higher frequency in said control winding, and means for energizing the other relay winding in response to the presence in said control winding of alternating current of said relatively low frequency.

18. In self-balancing apparatus, the combination of a rebalancing motor having a control winding, an electronic amplifying and motor drive system adapted to supply to said control winding a current at a predetermined and relatively low frequency and of a phase and magnitude depending on the phase and magnitude of an alternating current control signal impressed on said system, and to supply alternating current of a higher frequency to said winding when said signal fades away, means including two separately energizable relay windings and operating to produce one effect, or a reverse effect, as one or the other of said relay windings is operatively energized, frequency discrimination means responsive to the frequency of the current in said control winding and including an output circuit for current of said higher frequency and a first resistance in said output circuit, and associated apparatus for operatively energizing one of said relay windings in response to the appearance in, and for operatively energizing the second of said relay windings in response to the disappearance from, said control winding of alternating current of said higher frequency, said associated apparatus comprising a first triode having a control grid, a first energizing circuit, means connecting said first energizing circuit and said one relay winding in the plate circuit of said first triode, a second triode having a control grid, a second energizing circuit, means connecting said second energizing circuit and said other relay winding in the plate circuit of said second triode, a second resistance, a first diode having an anode and a cathode and having its cathode connected to the control grid of said first triode and to one end of said second resistance and having its anode and cathode connected in series with said second resistance across said first resistance so as to increase the potential of the anode of said diode and thereby make said first triode conductive when current of said higher frequency flows through said first resistance, a third resistance, and a second diode having an anode and a cathode and having its anode connected to the control grid of said second triode and to one end of said third resistance and having its anode and cathode connected in series with said third resistance across said first resistance, reversely relative to the connection of the anode and cathode of said first diode to said first resistance, so as to decrease the potential of the anode of said second diode and thereby make said second triode non-conductive when current of said higher frequency flows through said first resistance, said first triode being non-conductive and said second triode being conductive when current of said higher frequency is not flowing through said first resistance.

19. Self-balancing apparatus as specified in claim 18 in which the connection between the control winding and the two diodes comprises a third triode having a control grid connected to said control winding and having an anode, and a condenser connecting the anode of said third triode to the anode of the first mentioned diode and to the cathode of said second diode.

20. Self-balancing apparatus as specified in claim 18 in which the connection between the control winding and the two diodes comprises a third triode having a control grid connected to said control winding and having an anode, a condenser connecting the anode of said third triode to the anode of the first mentioned diode and to the cathode of said second diode, and a low frequency current attenuator connecting the control grid and output circuit of said third triode.

21. Self-balancing measuring apparatus comprising in combination, a pair of triodes having a common output circuit in which the anode and cathode of one triode and an energizing circuit adapted to supply alternating current of predetermined frequency are connected in series with one another and in parallel with the anode and cathode of the other triode and a second energizing circuit adapted to supply alternating current of said frequency but displaced 180° in phase with the first mentioned current, the last mentioned anode, cathode and energizing circuit being connected in series with one another, an electronic amplifying system, a circuit network subject to unbalancing effects, means responsive to unbalance of said network for impressing on said amplifying system an alternating signal of said frequency and of a magnitude proportional to the magnitude of said unbalance and in phase with one or the other of said currents, accordingly as said unbalance is in one direction or the other, connections between said amplifying system and the control grids and cathodes of said triodes for simultaneously impressing the signal amplified in said system on said control grids, rebalancing means connected to said output circuit and actuated by said output currents therein of said predetermined frequency to rebalance said network, and balance anticipating means connected to said output circuit and selectively responsive to alternating current flow therein of a frequency double that of said predetermined frequency, whereby said balance responsive means is actuated when the measuring circuit balance is closely approached.

22. A self-balancing measuring and control system comprising in combination a normally balanced measuring circuit adapted to be unbalanced by a change in the value of the quantity measured, an electronic amplifying network, means responsive to unbalance in said measuring circuit for impressing on said network an alternating current motor drive signal which is of a predetermined frequency and of a phase depending upon the direction of circuit unbalance and which fades away as system balance is attained in a subsequent rebalancing operation, a reversible rebalancing motor having a control winding, and means through which said network supplies current to said winding of said frequency and of a phase and magnitude depending on said signal for operation of said motor to rebalance the said circuit, and through which said network supplies current of higher frequency to said winding as said signal fades away, a relay mechanism comprising a winding and an element moved in one direction by said winding when the latter is energized and moved in a second direction when said winding is deenergized, and means for energizing said winding when current of said higher frequency is supplied to said control winding comprising a frequency discriminator and a switch normally maintained in a closed position and connected to said element for retarded movements into an open position and back into said closed position following movements of said element respectively in said one direction and in said second direction, said switch deenergizing said winding when moved out of its closed position.

23. A self-balancing system as specified in claim 22, including a recording element actuated by said first mentioned element for movement into and away from a recording position as said first mentioned element respectively moves in said one direction and in said second direction.

24. A self-balancing system as specified in claim 22, including a selector switch for successively connecting to said measuring circuit a series of different voltage sources to be successively measured, and connections through which said selector switch is operatively actuated by said first mentioned element on each movement of the latter in said second direction.

25. A self-balancing system as specified in claim 22, including a selector switch for successively connecting to said measuring circuit a series of different voltage sources to be successively measured, a recording element, and including an operating connection between said first mentioned element and said recorder element and an operating connection between said first mentioned element and said selector switch through which said first mentioned element actuates said recording element on each movement in said one direction and actuates said selector switch on each movement in said second direction.

26. Control apparatus for a load device circuit including electronic amplifying means to supply to the load device circuit under one condition of operation a current at a predetermined and relatively low frequency and to supply to the load device circuit under another condition of operation a current of a higher frequency, means including two separately energizable relay windings and operating to produce one effect, or a reverse effect, as one or the other of the relay windings is energized, means for energizing one of said relay windings in response to the presence of current of said higher frequency in said load device circuit comprising, a diode having an anode connected to said load device circuit and having a cathode, a triode having a control grid, bias means connecting said grid to the cathode of said diode, an energizing circuit, and means connecting said energizing circuit and said one relay winding in the plate circuit of said triode, and means for energizing the other of said relay windings in response to the appearance of current of said relatively low frequency in said load device circuit comprising a second diode having a cathode connected to said load device circuit and having an anode, a second triode having a control grid, bias means connecting the last mentioned grid to the anode of said second diode, a second energizing circuit, and means connecting said second energizing circuit and said second relay winding in the plate circuit of said second triode.

27. Control apparatus including a member movable between two positions depending upon the appearance and non-appearance of an electric signal comprising a pair of electronic valves each having an output circuit and an input circuit, a common source of energizing voltage for both of said output circuits, a separate relay winding connected in each of said output circuits, said member being arranged to be actuated to one position when the energization of one of said relay windings over balances that of the other and to be actuated to another position when the energization of the other relay winding over balances that of said one relay winding, means to impress biasing voltages of opposite polarity to the input circuits of said valves whereby one of said valves is normally more conductive than the other of said valves, and means connected in each of said input circuits through which a high frequency current is adapted to flow to produce a voltage in the input circuit of said one of said valves opposing the biasing voltage therein to reduce the conductivity of said one valve and to produce in the input circuit of the other valve a voltage opposing the biasing voltage therein to increase the conductivity of said other valve.

RUDOLF F. WILD.

REFERENCES CITED

The following references are of record in the file of this patent:

UNITED STATES PATENTS

| Number | Name | Date |
|---|---|---|
| 2,124,684 | Behr et al. | July 26, 1938 |
| 2,209,369 | Wills | July 30, 1940 |
| 2,348,744 | McMurry | May 16, 1944 |
| 2,352,103 | Jones | June 20, 1944 |
| 2,376,527 | Wills | May 22, 1945 |
| 2,376,599 | Jones | May 22, 1945 |
| 2,423,540 | Wills | July 8, 1947 |